(12) United States Patent
Maria

(10) Patent No.: US 10,484,731 B2
(45) Date of Patent: *Nov. 19, 2019

(54) METHOD AND APPARATUS FOR SPONSORED MESSAGING

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,367

(22) Filed: Sep. 12, 2018

(65) Prior Publication Data

US 2019/0014369 A1 Jan. 10, 2019

Related U.S. Application Data

(63) Continuation of application No. 15/219,439, filed on Jul. 26, 2016, now Pat. No. 10,104,417.

(51) Int. Cl.
*H04N 21/2668* (2011.01)
*H04L 29/06* (2006.01)
(Continued)

(52) U.S. Cl.
CPC ......... *H04N 21/2668* (2013.01); *G10L 15/26* (2013.01); *G10L 15/30* (2013.01);
(Continued)

(58) Field of Classification Search
None
See application file for complete search history.

(56) References Cited

U.S. PATENT DOCUMENTS 7,620,551 B2 11/2009 Ho
8,060,399 B2 11/2011 Ullah
(Continued)

FOREIGN PATENT DOCUMENTS

EP 2224684 A1 9/2010
KR 20090110764 6/2008
(Continued)

OTHER PUBLICATIONS

"In-program video advertising is the new black", https://web.archive.org/web/20151118073403/http://www.watchwith.com/monetize/, Discloses a system of delivering targeted content based on specific segments of a played video., Nov. 18, 2015.
(Continued)

*Primary Examiner* — Omar S Parra
(74) *Attorney, Agent, or Firm* — Guntin & Gust, PLC; Douglas Schnabel

(57) ABSTRACT

Aspects of the subject disclosure may include, for example, a method including monitoring a communication network managed by a service provider to detect transmission of content to a communication device through the communication network, analyzing content information associated with the content that is transmitted to the communication device to identify a feature of the content, capturing a user-generated comment that is transmitted from the communication device through the communication network, analyzing the user-generated comment that is captured to detect an occurrence of a keyword that is associated with the feature of the content, determining whether the keyword in the user-generated comment was temporally associated with the feature of the content transmitted to the communication device to identify an occurrence of a trigger event associating the keyword with the feature of the content, and responsive to identification of the occurrence of the trigger
(Continued)

event, transmitting a message associated with the trigger event to the communication device. Other embodiments are disclosed.

20 Claims, 7 Drawing Sheets

(51) Int. Cl.

| | | |
|---|---|---|
| *H04L 12/58* | (2006.01) | |
| *H04W 4/14* | (2009.01) | |
| *H04N 21/422* | (2011.01) | |
| *H04N 21/81* | (2011.01) | |
| *H04N 21/4784* | (2011.01) | |
| *H04N 21/24* | (2011.01) | |
| *H04N 21/442* | (2011.01) | |
| *G10L 15/26* | (2006.01) | |
| *G10L 15/30* | (2013.01) | |
| *H04N 21/488* | (2011.01) | |
| *H04N 21/858* | (2011.01) | |
| *H04N 21/4725* | (2011.01) | |
| *G10L 25/54* | (2013.01) | |
| *H04N 21/478* | (2011.01) | |
| *H04N 21/4788* | (2011.01) | |
| *H04N 21/647* | (2011.01) | |
| *G10L 15/08* | (2006.01) | |

(52) U.S. Cl.
CPC .............. *G10L 25/54* (2013.01); *H04L 51/08* (2013.01); *H04L 65/4069* (2013.01); *H04N 21/2408* (2013.01); *H04N 21/42203* (2013.01); *H04N 21/44218* (2013.01); *H04N 21/4725* (2013.01); *H04N 21/4784* (2013.01); *H04N 21/4788* (2013.01); *H04N 21/47815* (2013.01); *H04N 21/4882* (2013.01); *H04N 21/64784* (2013.01); *H04N 21/812* (2013.01); *H04N 21/858* (2013.01); *H04W 4/14* (2013.01); *G10L 2015/088* (2013.01)

(56) References Cited

U.S. PATENT DOCUMENTS

| | | | |
|---|---|---|---|
| 8,145,528 | B2 | 3/2012 | Gilley et al. |
| 8,170,584 | B2 | 5/2012 | Kim et al. |
| 8,196,162 | B2 | 6/2012 | van de Klashorst |
| 8,239,887 | B2 | 8/2012 | Fogel et al. |
| 8,418,198 | B2 | 4/2013 | Scott et al. |
| 8,677,020 | B2 | 3/2014 | Levkovitz et al. |
| 8,695,031 | B2 | 4/2014 | Steinberg et al. |
| 8,825,022 | B2 | 9/2014 | Lee et al. |
| 8,849,931 | B2 | 9/2014 | Linner et al. |
| 8,887,197 | B2 | 11/2014 | Renger et al. |
| 9,043,828 | B1 | 5/2015 | Jing et al. |
| 9,195,993 | B2 | 11/2015 | Ramer et al. |
| 9,203,912 | B2 | 12/2015 | Krishnaswamy et al. |
| 2002/0059590 | A1 | 5/2002 | Kitsukawa et al. |
| 2006/0271438 | A1 | 11/2006 | Shotland et al. |
| 2007/0208619 | A1 | 9/2007 | Branam et al. |
| 2008/0120178 | A1 | 5/2008 | Martinez et al. |
| 2009/0164301 | A1 | 6/2009 | O'Sullivan et al. |
| 2011/0099164 | A1 | 4/2011 | Melman et al. |
| 2013/0067109 | A1 | 3/2013 | Dong et al. |
| 2018/0035148 | A1 | 2/2018 | Maria |

FOREIGN PATENT DOCUMENTS

| | | |
|---|---|---|
| KR | 20160058973 | 8/2015 |
| WO | 2009003162 A3 | 3/2009 |
| WO | 2015179699 | 11/2015 |

OTHER PUBLICATIONS

"Targeting your video ads", https://web.archive.org/web/20150919152018/https://support.google.com/adwords/answer/2454017?hl=en, Discloses a methos of assigning keywords to videos in order to target users with specific interests., Sep. 19, 2015.
Perez, Sarah, "Roku and Innovid Roll Out Interactive Video Ads, Including SMS-Based Reminder to Watch", https://techcrunch.com/2015/06/18/roku-and-innovid-roll-out-interactive-video-ads-including-sms-based-reminders-to-watch/, Discloses a system of sending SMS-based advertisements to users based on selected video content., Jun. 18, 2015.

300

METHOD AND APPARATUS FOR SPONSORED MESSAGING

CROSS REFERENCE TO RELATED APPLICATIONS

This application is a continuation of U.S. patent application Ser. No. 15/219,439 filed Jul. 26, 2016. The contents of the foregoing are hereby incorporated by reference into this application as if set forth herein in full.

FIELD OF THE DISCLOSURE

The subject disclosure relates to a method and apparatus for sponsored messaging

BACKGROUND

Content, including media content, is typically experienced by consumers via devices such as computers, televisions, radios, and mobile electronics. Media content can be delivered by service providers, who send the content, such as television, radio, and video programming, to consumers for enjoyment at their physical locations. Modern communications networks benefit from interconnectivity between consumers and various communication devices. As network capabilities expand, these interconnections can provide new opportunities to enhance the ability for consumers to enjoy content by experiencing a variety of content over multiple devices. Intelligent devices offer means for the enjoyment of content in ways that anticipate consumer personalization of media content presentation.

BRIEF DESCRIPTION OF THE DRAWINGS

Reference will now be made to the accompanying drawings, which are not necessarily drawn to scale, and wherein.

DETAILED DESCRIPTION

Figure 1:
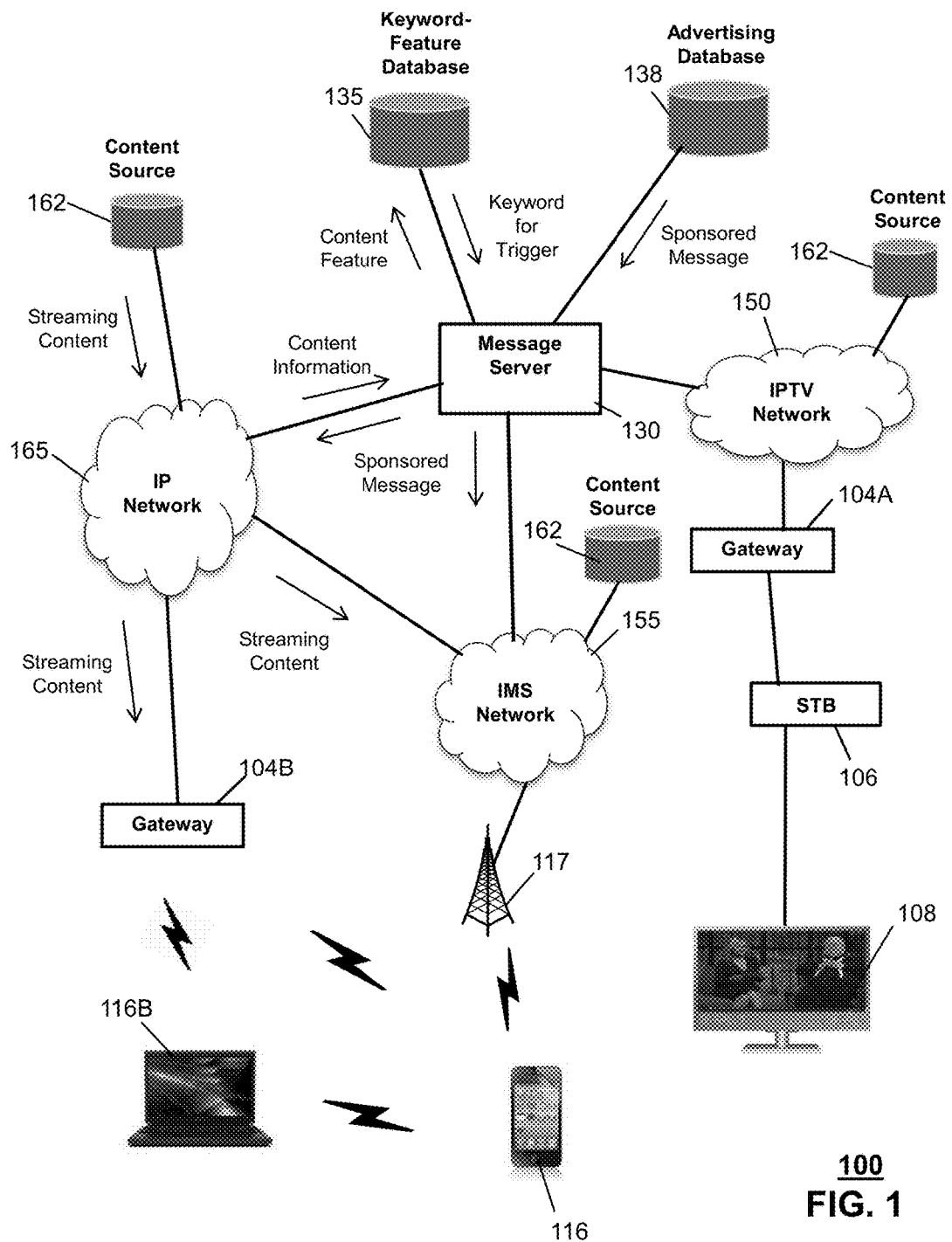
FIG. 1 depicts an illustrative embodiment of a system that can be utilized for providing sponsored messages triggered by associations of content features and user comments.

The subject disclosure describes, among other things, illustrative embodiments for providing sponsored messages that are triggered by associations of content features and user comments. Content may be streamed "over the top" (OTT) from an Internet website and/or application, such as Netflix™, to a computer device, such as a wireless communication device, via a communication network. In this scenario, the communication network connects the streaming application to the computer device. From a commercial standpoint, the streaming content transaction is between the user of the device and the streaming application, while the communication network serves only as a conduit of the data to the subscriber of the device. A communication network can be monitored to detect streaming of content through the communication network. The content and/or features in the content (e.g., sections, break points, image features, etc.) can be identified. User-generated content from a device can also be monitored, with permission, as this content is transmitted through the communication network. Trigger events can be defined, where these trigger events associate occurrences of features in the streaming content with occurrences of keywords in the user-generated comments from the device. Upon the occurrence of a trigger event, a sponsored message can be sent to the device. Other embodiments are described in the subject disclosure.

One or more aspects of the subject disclosure include a server that can include a processing system including a processor and a memory that stores executable instructions that, when executed by the processor, facilitate performance of operations, including monitoring a communication network managed by a service provider to detect streaming of content to a communication device through the communication network. The processing system can also perform operations for analyzing content information associated with the content that is streamed to the communication device to identify a feature of the content. The processing system can further perform operations for defining a trigger event corresponding to an occurrence in temporal proximity of a keyword in a user-generated comment associated with the communication device and a viewing of the feature of the content at the communication device The processing system can perform operations for monitoring the communication network to capture user-generated information that is transmitted from the communication device through the communication network. The processing system can also perform operations for analyzing the user-generated information that is captured to identify the occurrence of the keyword in the user-generated comment. The processing system can perform operations for determining whether the keyword in the user-generated comment was temporally associated with the viewing of the feature of the content streamed to the communication device to identify an occurrence of the trigger event. The processing system can further perform operations for querying a database for a message associated with the occurrence of the trigger event responsive to identification of the occurrence of the trigger event, and, in turn, transmitting the message associated with the trigger event to the communication device.

One or more aspects of the subject disclosure include a machine-readable storage medium, including executable instructions that, when executed by a processing system including a processor, facilitate performance of operations, including monitoring a communication network managed by a service provider to detect transmission of content to a communication device through the communication network. The processing system can also perform operations for analyzing content information associated with the content that is transmitted to the communication device to identify a feature of the content, and, in turn, defining a trigger event associating a keyword with the feature of the content. The processing system can further perform operations for capturing a user-generated comment that is transmitted from the communication device through the communication network, and, in turn, analyzing the user-generated comment that is captured to detect an occurrence of the keyword in the user-generated comment. The processing system can perform operations for determining whether the keyword in the user-generated comment was temporally associated with the feature of the content transmitted to the communication device to identify an occurrence of the trigger event. The processing system can perform operations for querying a database for a message associated with the occurrence of the trigger event responsive to identification of the occurrence of the trigger event, and, in turn, transmitting the message associated with the trigger event to the communication device.

One or more aspects of the subject disclosure include a method including monitoring, by a processing system including a processor, a communication network managed by a service provider to detect transmission of content to a communication device through the communication network. The method can also include analyzing, by the processing system, content information associated with the content that is transmitted to the communication device to identify a feature of the content. The method can further include capturing, by the processing system, a user-generated comment that is transmitted from the communication device through the communication network, and, in turn, analyzing, by the processing system, the user-generated comment that is captured to detect an occurrence of a keyword that is associated with the feature of the content. The method can include determining whether the keyword in the user-generated comment was temporally associated with the feature of the content transmitted to the communication device to identify an occurrence of a trigger event associating the keyword with the feature of the content. The method can also include transmitting, by the processing system, a message associated with the trigger event to the communication device responsive to identification of the occurrence of the trigger event.

FIG. 1 depicts an illustrative embodiment of a system that can be utilized for providing content to devices. In one or more embodiments, the system 100 can include one or more communication networks 150, 155, and 165, which can include, for example, an Internet Protocol Television (IPTV) Network 150, an Internet Protocol (IP) Network 165, and/or an IP Multimedia Subsystem (IMS) network 155. In one embodiment, content can be routed from a content source 162 to the IPTV network 150, which, in turn can deliver content to a gateway device 104A. In turn, the gateway device 104A can route content to a media processor device 106, such as a set-top box (STB). In another embodiment, a content source 162 can deliver content by the IMS network 155 to a mobility network 117. The mobility network 117 can route content to a mobile communication device 116, such as a wireless smart phone, via a cellular, long term evolution (LTE), third generation (3G), and/or fourth generation (4G) wireless networks. In another embodiment, the mobile communication device 116B can route content that is received over the mobility network 117 by, for example, a mobile hotspot Wi-Fi link between the mobile communication device 116 and a computer device 116B or a media device 108. In another embodiment, a content source 162 can deliver content over a public IP network 165. In turn, the IP network 165 can deliver content through a gateway device 104B to a mobile communication device 116 and/or wireless communication devices 116B.

In one embodiment, the system 100 can incorporate one or more subscription content services. For example, the subscription content service can be part of a cable, satellite, fiber optic, and/or DSL based media content delivery system. The content can be any type of content, such as broadcast television, cable or premium television, video on demand, or pay-per-per view television. The content can be software content, including entire software programs, upgrades to programs, and/or additions to programs. Content can be subscription-based, such as basic cable, premium cable, movie channel content, and/or Internet-based content from an Internet website or application. The content can be non-subscription-based, such as "free" Internet-based content of over-the-air television content and/or single offers or purchases of content. In one embodiment, the system 100 can include one or more content sources 162, which can provide content to one or more delivery networks 150, 155, and 165. For example, a content source 162 can deliver media content services via an internet protocol television (IPTV) network 150, an internet protocol multimedia subsystem network 155, and/or an internet protocol network.

The system 100 can further include authentication functions to insure that media content is distributed only to verified subscribers of the system 100, the networks 150, 155, and 165, and/or the media content sources 160 according to service plan levels of those subscribers. For example, the system 100 can verify that media processor device 106 is be properly identified and validated for receiving media content over the system 100. For example, one or more authentication servers can be used to verify the subscription status of the media processor device 106. Device identifying information, such as MAC address, IP address, and/or SIM card information, can be transmitted to an authentication server. An authentication server can use this identifying information from the media processor device 106 to inquire at a subscriber database of service plan information for a subscriber who is associated with the device 106. The subscriber database can provide subscription status and service plan information to allow the authentication server to enable delivery of purchased media content to the media processor device 106. In one or more embodiments, the media content can be selected based on a number of techniques and criteria, such as based on user input, user preferences, user profiles, monitored user viewing history, and so forth.

In one embodiment, a gateway device 104A can function as an interface between the IPTV network 155 and the media processor device 106. In one embodiment, the gateway device 104A can provide internet working functions, such as protocol translation, impedance matching, data rate conversion, and/or fault isolation necessary for exchanging data between the IPTV network 150 and the home-based media processor device 106. In one embodiment, a gateway device 104B can provide access to a public IP network 165 of the system 100. The public IP network 165 can facilitate communications to Internet-based applications, websites, and databases, such as Social Media sites and Web Databases. This connectivity can allow devices 116 and servers 130 in the system 100 to access and be accessed by the various Internet-based applications, websites, and/or databases.

In one or more embodiments, a message server 130 can be included in the communication system 100. The message server 130 can provide sponsored messages to devices 116 via the communication system 130, where the sponsored messages can be triggered by associations of features streaming content and user comments associated with those features. In one or more embodiments, the message server 130 can facilitate media and/or advertising campaigns. For example, while mobile communication devices 116 allow users to watch streaming video via an Over the Top (OTT) service, such as a football games or a movie, the message gateway 130 can be capable of knowing details about the streaming content. For example, the message server 130 can know about football quarters, movie scenes, and so forth, that make up the streaming content. The message server 130 can identify voice conversations at the mobile communication device 116 is conducting using, for example, Voice-over-LTE (VoLTE) or Voice-over-IP (VoIP) applications. The message server 130 can determine if one or more key words in the conversations are occurring at roughly the same time as key content scenes or sections of the content. In one or more embodiments, the message server 130 can reside in the LTE core of the telecommunications service provider. In one or more embodiments, the message server 130 can interface with System Signal 7 (SS7) based elements, such as SMS Centers (SMSC). The message server 130 can issue appropriate commands for SMS communications.

In one or more embodiments, when certain keywords are spoken by a user to a device 116 engaged in a call session with another device, then the message server 130 can determine if the keywords concurrently match or support features of the content that being streamed to the device 116 or to another device of the user. If a match is found, then the message server 130 can send an appropriate sponsored message, advertisement, coupons, or other selected text to the user (or subscriber) via real-time messaging services and/or SMS text messages. For example, a football game or movie scene can be streamed to a mobile communication device 116. The message server 130 can determine whether the game or scene includes depictions or references to food content and, further, can determine whether the user of the mobile communication device 116 has spoken and/or texted keywords about food in a time period near that of the depictions and/or references to food If this content feature plus related keyword combination is detected, then the message server 130 can query an Advertising Database 138 with an indication of the occurrence of the Trigger Event. The Advertising Database 138 can retrieve a sponsored message, which can be sent to the mobile communication device 116 by the message server 130. For example, a coupon for pizza could be sent to the subscriber and the subscriber could respond real time to this advertisement.

In one or more embodiments, the message server 130 can access and/or include a large Keyword—Feature database 135. The Keyword—Feature database 135 can include a set of descriptions of content features—qualities, characteristics, and/or logical sections. For example, the content features can be logical sections or breakpoints in streaming sporting events, including beginning of a game, halftime and intermission, end of a game, scoring events, and so forth. Similarly, content features for an entertainment program can include, for example, a beginning, an end, an intermission or commercial break, changes of scene or location, and/or common scene types (e.g., climax of action, a chase, introduction of a new character, death of a character, and so forth). The Keyword—Feature database 135 can also include a set of keywords that could be included in comments or conversations that might emanate from a user of a communication device 116, who is watching the streaming content on that device 116 or on another device 116B or 108. For example, the Keyword—Feature database 135 can include words and/or phrases, such as coffee, iPhone™, vacation, new car, gift, anniversary, remodel, and the like.

In one or more embodiments, a sponsor or advertiser might want to target a consumer at the nexus the consumer's participation in viewing the streaming content and that consumer's comment and/or conversation occurring in proximate time to the viewing of the content. That is, the sponsor or advertiser can seek to take particular advantage of specific features of the streaming content—such as particular plot twists or emotions or breaks in the action or any other detectable and describable feature—as a contextual frame for the consumer. What is on the consumer's mind in reaction to the particular feature of the streaming content? By monitoring the consumer's comments/conversations and correlating these comments/conversations to the particular features occurring in the streaming content, the sponsor or advertiser can gain a window into the consumer that can be particularly useful for targeted advertising. The message server 130 can select (on behalf of sponsors or advertisers) certain combinations of streaming content features occurring concurrently (or nearly concurrently) with selected keywords to define triggers for an advertising message. In one or more embodiments, the Keyword—Feature database 135 can be implemented as an Artificial Intelligence (AI) database.

In one or more embodiments, the message server 130, or messaging gateway for OTT streaming (MGO) can interface with existing LTE services, such as Short Message Service (SMS) gateways, and/or VoLTE IMS gateways in order to monitor and/or intercept voice and/or text traffic transmitted from a mobile communication device 116 of a user. The message server 130 can collect conversational content from call sessions and/or text content from text messages, social network postings, and the like, as this user-generated content is transmitted from the mobile communication device and though any of the communication networks 150, 155, 165 for which the message server 130 has administrative access to the this information as well as permission from the consumer/user of the mobile communication device 116 or other device 116B to perform such monitoring. The message server 130 can parse, decode, and/or analyze the user-generated content, as needed, to convert from voice to text and to, further, detect certain patterns of speech and, in particular, to detect and/or identify the occurrence of certain keywords in the user-generated content. In one or more embodiments, the message gateway 103 can be implemented as a Front End Processor (FEP) to existing gateways in the LTE and/or IMS network 155. In one or more embodiments, the message server 130 can be implemented as a separate Network Element (NE) or a Virtualized Network Function (VFN). In one embodiment, the message server 130 can analyze subscriber VoLTE and/or VOIP voice traffic in a real-time manner and/or concurrently with the OTT content as it is being streamed to the communication device 116. In one or more embodiments, the message server 130 can server as a front end and/or interface with IMS applications, such as VoLTE gateways and/or servers to intercept VoIP traffic.

In one embodiment, the user-generated content (voice or text) can be associated with the same subscriber that is receiving the streamed content being transmitted through the network 100. For example, a user can be receiving streaming content at a computer device 116, and concurrently (or nearly so) post comments to social media site. In analyzing the social media comments, the message server 130 can assume that these comments may well be related to, or inspired by, the user's reactions to the streaming content. In another example, the user can be receiving the streaming content transmitting user-generated content via different devices. In this case, the user could still receive the streaming content at the computer device 116B through the IP Network 165 while transmitting user-generated content via the mobile communication device 116 via a VoIP call session and/or text messages sent through the IMS Network 155.

In one or more embodiments, the message server 130 can monitor activities within the communication system 100. For example, one or more networks 150, 155, and 165 can be operated, in total or in part, by a service provider. The service providers can, for example, provide connectivity for a computer device 116B to the IP Network 165, even if the overwhelming majority of websites, services, and/or content that are available via the IP Network 165 are provided by other entities. In one or more embodiments, a service provider can operate multiple parts of the communication system 100, such as, for example an IMS Network 155 for providing wireless communication services to mobile communication devices 116, an IPTV network 150 for providing television services to display devices 108. Thus, the message server 130 can monitor activities occurring in various parts of the communication system 100, including concurrently monitoring activities in different networks, network types, servers, services, gateways, and communication links.

In one or more embodiments, the message server 130 can monitor one or more networks 150, 155, and 165 for OTT streaming content traffic. For example, the message server 130 can monitor for occurrences of a device of a user or subscriber accessing an OTT streaming site, service, or application, where the access uses any part of the service provider network. For, example, a subscriber to an Internet Service Provider (ISP) may user the network elements, such as a gateway 104B, of the ISP to access an OTT streaming service via the IP Network 165. The message server 130 of the ISP can monitor for this access and can, further, intercept, inspect and analyze the OTT video streaming traffic flowing through the existing gateway 104B or any other of the ISP's gateways that this access implicates. In another example, a subscriber to telecommunication services for a mobile communication device 116 can access a sports site to stream a football game or a movie site to stream a movie. The message server 130 can access this streaming content as it flow through the telecommunication network. In one or more embodiments, the message server 130 can identify the streaming traffic based on header information or previous provisioning parameters or. For example, the message server 130 can parse the header information in data packets of the streaming content. The header information can include a name of the streaming content, the content's data size (length), and/or an address of a communication device 116 that is the target of streaming. In another example, the message server 130 can review previous provisioning parameters associated with prior streaming of the content stream to the target device to derive the identity of the content, its length, and/or the address of the target recipient device 116.

In one or more embodiments, the message server 130 can further identify appropriate scenes and/or sections of the content. For example, the message server 130 can identify logical sections or breakpoints in streaming sporting events, including beginning of a game, halftime and intermission, end of a game, scoring events, and so forth. Similarly, the message server 130 can identify content features for an entertainment program that can include, for example, a beginning, an end, an intermission or commercial break, changes of scene or location, and/or common scene types (e.g., climax of action, a chase, introduction of a new character, death of a character, and so forth).

In one or more embodiments, the message server 130 can also interface with appropriate billing records and interfaces for monetization of the sponsored message service. For example, there may be an offer that would provide a subscriber with a data discount if a certain coupon is used. In this case, the message server 130 can keep track of subscribers and provide this information to a billing engine so that an appropriate data credit would be issued to the subscriber. In one or more embodiments, the message server 130 can include an interface to external web services residing in the IMS Network 155, the LTE Network, and/or a cloud-based network of the service provider. The interface can allow the service provider enterprise to provision coupons, media and content offers.

In one or more embodiments, the message server 130 can allow subscribers to opt in or opt out of the sponsored message service. The monitoring of content streaming and, in particular, the monitoring of user-generated content and/or comments and/or conversations at a communication device 116 of a subscriber may necessarily require permission of the subscriber. In one embodiment, the message server 130 can require an active opting in by the subscriber before any monitoring is performed. In another embodiment, the message server 130 can use an opting out provision, whereby the subscriber is presumed to have given permission unless she actively opt out. In one embodiment, the message server 130 can use a multiple level permission regime, where the monitoring of streaming content requires a lessor level of permission than the monitoring of user-generated information and/or conversations. In one or more embodiments, the message server 130 can include an interface to external servers for provisioning a subscriber's preferences or for allowing subscribers to be able to check their data credits on a real time basis.

In one or more embodiments, the message server 130 can store and maintain a history of services provided to individual subscribers for billing and media content offers purposes. The message server 130 can also anonymize records of subscribers so that the information that is collected will not be traceable to individual subscribers. The collected historical information can be potentially marketed and/or sold to media and content advertisement firms. The message server 130 can also have an interface to external search engines, such as Google™ and Bing™ in order to sell anonymized subscriber information for advertisement and media content purposes. The message server 130 can also have AI components that can provide search engine services to subscribers of the service provider. Mobile applications can be developed to exploit the information captured from subscribers as they order and purchase services at the same time that content is being streamed.

Figure 2:
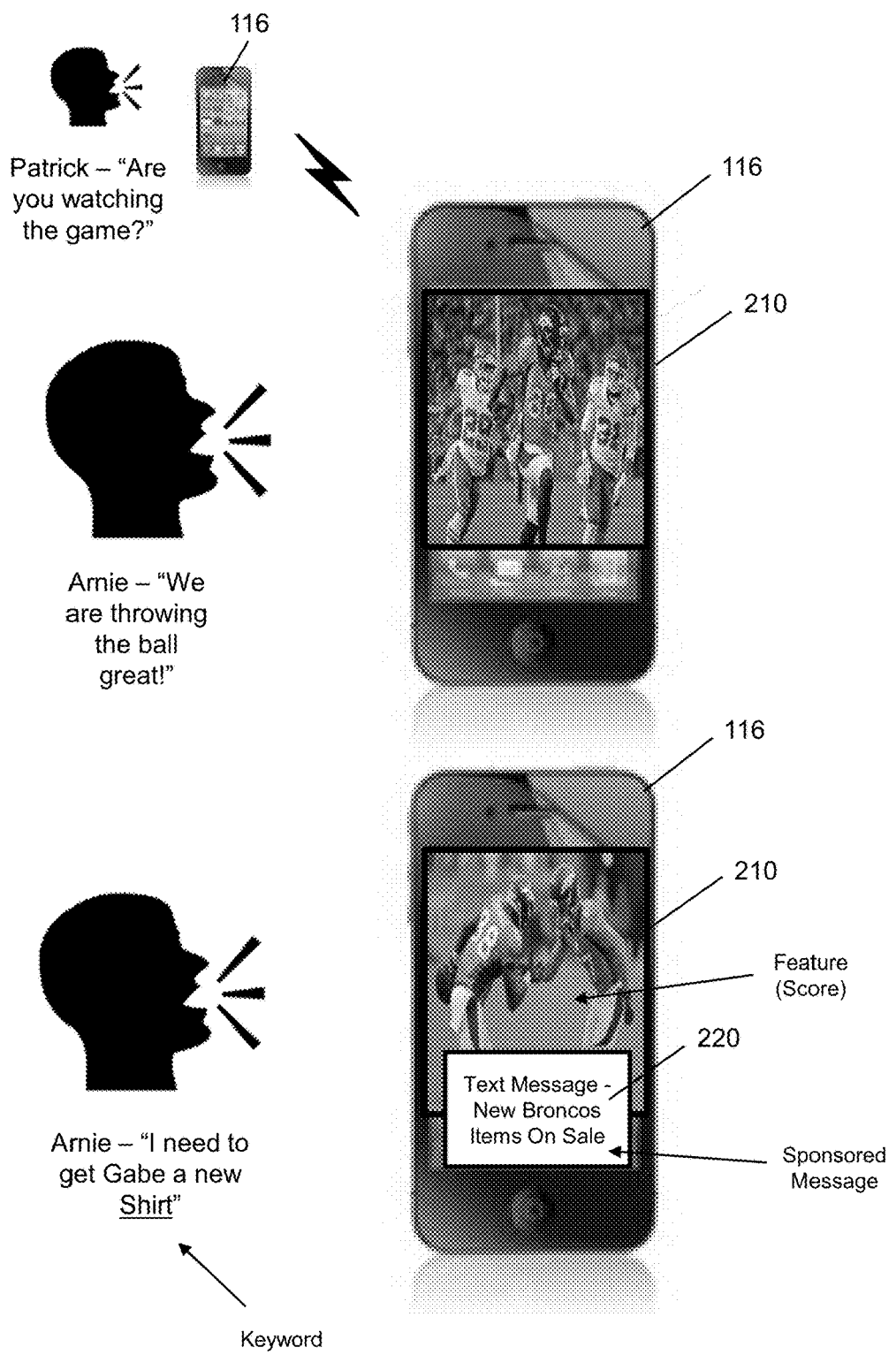
FIG. 2 depicts an illustrative embodiment of the system for providing sponsored messages triggered by associations of content features and user comments.

FIG. 2 depicts an illustrative embodiment of the system for providing sponsored messages triggered by associations of content features and user comments. User Arnie is watching a football game 210 that is being streamed to an application on his mobile communication device 116 from an OTT streaming source 162. As Arnie watches the game, he is also engaged in a VoIP LTE call with his friend, Patrick. The message server 130 has defined a sponsored message trigger based on a combination of a keyword and a content feature. Assuming that the message server 130 has permission from the user/subscriber, the message server 130 can monitor the streaming content 210 for particular features. The message server 130 can also monitor the VoIP LTE call for an occurrence of one or more keywords. In this example, the content feature is a score in the game, and the keyword is the work, "shirt." The message server 130 can look for a mutual occurrence of the feature and the keyword in temporal proximity. That is, the message server 130 is looking for the keyword and the feature to occur at around the same time. In one embodiment, the message server 130 can require that the keyword occurrence follows the feature occurrence. In one embodiment, the message server 130 can use timestamps in the streaming content and/or timestamps in the user-generated content to determine if the content feature and the keyword do occur in temporal proximity. When the message server 130 detects the keyword—feature trigger, the message server 130 can transmit a sponsored message 220 to the mobile communication device 116. In this case, the sponsored message 220 is a text message that is sent by the message server 130 using an SMS service.

Figure 3:
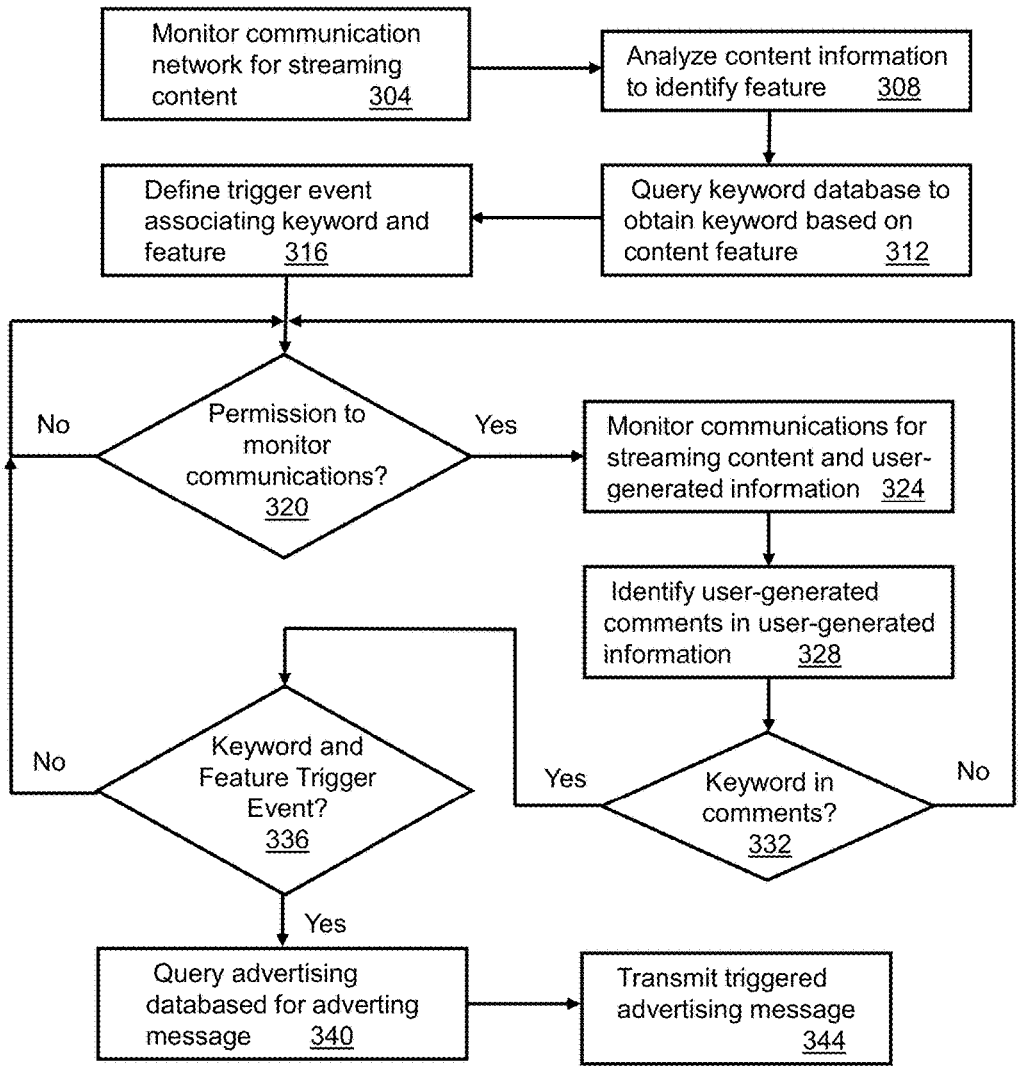
FIG. 3 depicts an illustrative embodiment of a method used in portions of the system described in FIGS. 1-2.

FIG. 3 depicts an illustrative embodiment of a method used by the system described in FIGS. 1-2. In one or more embodiments, the method provides for distribution of content for synchronous release at multiple devices. At step 304, a message server 130 of a service provider can monitor a communication network for streaming content being delivered to a computer device 116B and/or communication device 116 that is associated with the service provider. For example, the message server 130 can monitor for OTT content streaming though the service provider's network. If the message server 130 detects the content streaming, then, in step 308, the message server 130 can analyze content information to identify features of the content. In one embodiment, the message server 130 can identify a name of the content and/or the targeted receiving device 116. In one embodiment, the message server 130 can determine features of the content, such as beginning and ending point, content length, plot points, intermissions, and so on.

At step 312, the message server 130 can query a keyword database 135 to obtain a keyword based on the content feature. In one embodiment, the keyword database 135 can include a set of descriptions of content features—qualities, characteristics, and/or logical sections and can include a set of keywords that could be included in comments or conversations that might emanate from a user of a communication device 116. The keyword database 135 can return one or more keywords for the message server 130 to use for defining a trigger event for a sponsored message at step 316. At step 320, the message server 130 can determine if the message server 130 has permission to monitor communications in the system 100 that are associated with the communication device 116. The message server 130 can have one or more permissions for monitoring streaming content being received by the communication device 116 and/or monitoring user-generated content transmitted from the communication device 116. If the message server 130 does have permission, then then, at step 324, the message server 130 can monitor communications for the streaming content and the user-generated content.

At step 328, the message server 130 can determine if the user-generated information from the communication device 116 includes the one or more keywords that have been associated with the triggering event. In one or more embodiments, the message server 130 can extract user-generated comments from the user-generated information from the communication device 116. If the one or more keywords are, in fact, included in the user-generated comments, in step 332, then the message server 130 can determine, in step 336, whether the Keyword—Feature Trigger Event has occurred. In one or more embodiments, the message server 130 can determine if the one or more keywords occur in temporal proximity to the selected feature in the streaming content.

If the message server detects the Trigger Event, in step 336, then message server 130 can query and advertising database 138 in step 340. At step 344, the message server 130 can transmit the sponsored message to the communication device 116.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
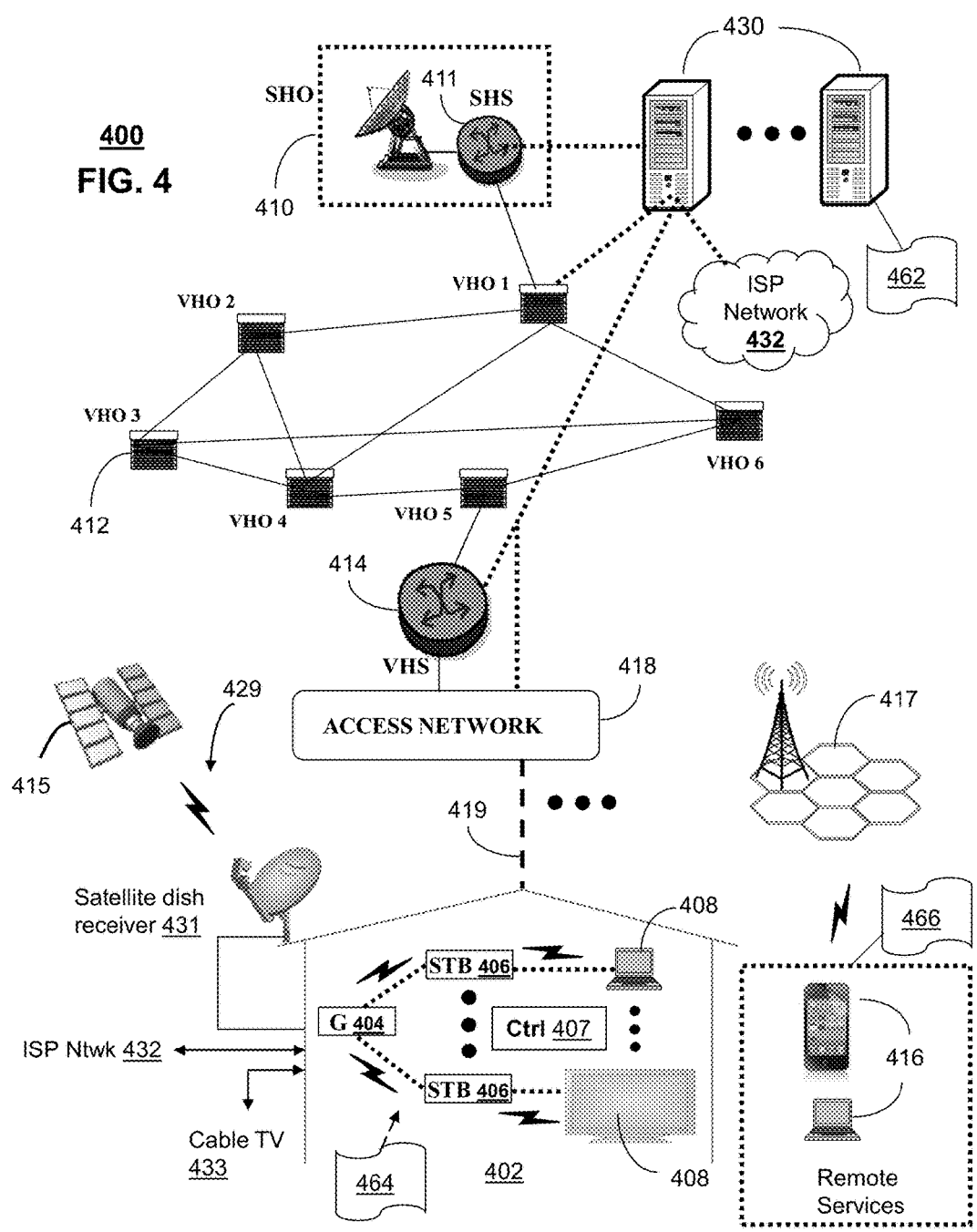
FIGS. 4-5 depict illustrative embodiments of communication systems that provide media services for use by the communication systems of FIGS. 1-2.

FIG. 4 depicts an illustrative embodiment of a first communication system 400 for delivering media content. The communication system 400 can represent an Internet Protocol Television (IPTV) media system. Communication system 400 can be overlaid or operably coupled with system 100-200 of FIGS. 1-2 as another representative embodiment of communication system 400. For instance, one or more devices illustrated in the communication system 400 of FIG. 4, for providing sponsored messages that are triggered by associations of content features and user comments. Content may be streamed "over the top" (OTT) from an Internet website and/or application to a computer device, such as a wireless communication device, via a communication network 400. The communication network 400 can connect the streaming application to the computer device, while the communication network 400 serves as a conduit of the data to the subscriber of the device. Content and/or features in the content can be identified, while user-generated content from a device can also be monitored and keywords can be detected as this user-generated content is transmitted through the communication network 400. Upon the occurrence of a trigger event, where the content feature and the keyword occur in temporal proximity, a sponsored message can be sent to the device.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416. Communication system 400 can also provide for all or a portion of the computing devices 430 to function as a message server (herein referred to as server 430). The server 430 can use computing and communication technology to perform function 462, which can include among other things, the techniques described by method 300 of FIG. 3. For instance, function 462 of server 430 can be similar to the functions described for message server 130 of FIG. 1 in accordance with method 300. The media processors 406 and wireless communication devices 416 can be provisioned with software functions 464 and 466, respectively, to utilize the services of server 430. For instance, functions 464 and 466 of media processors 406 and wireless communication devices 416 can be similar to the functions described for the media processor 106 and the mobile communication device 116 of FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
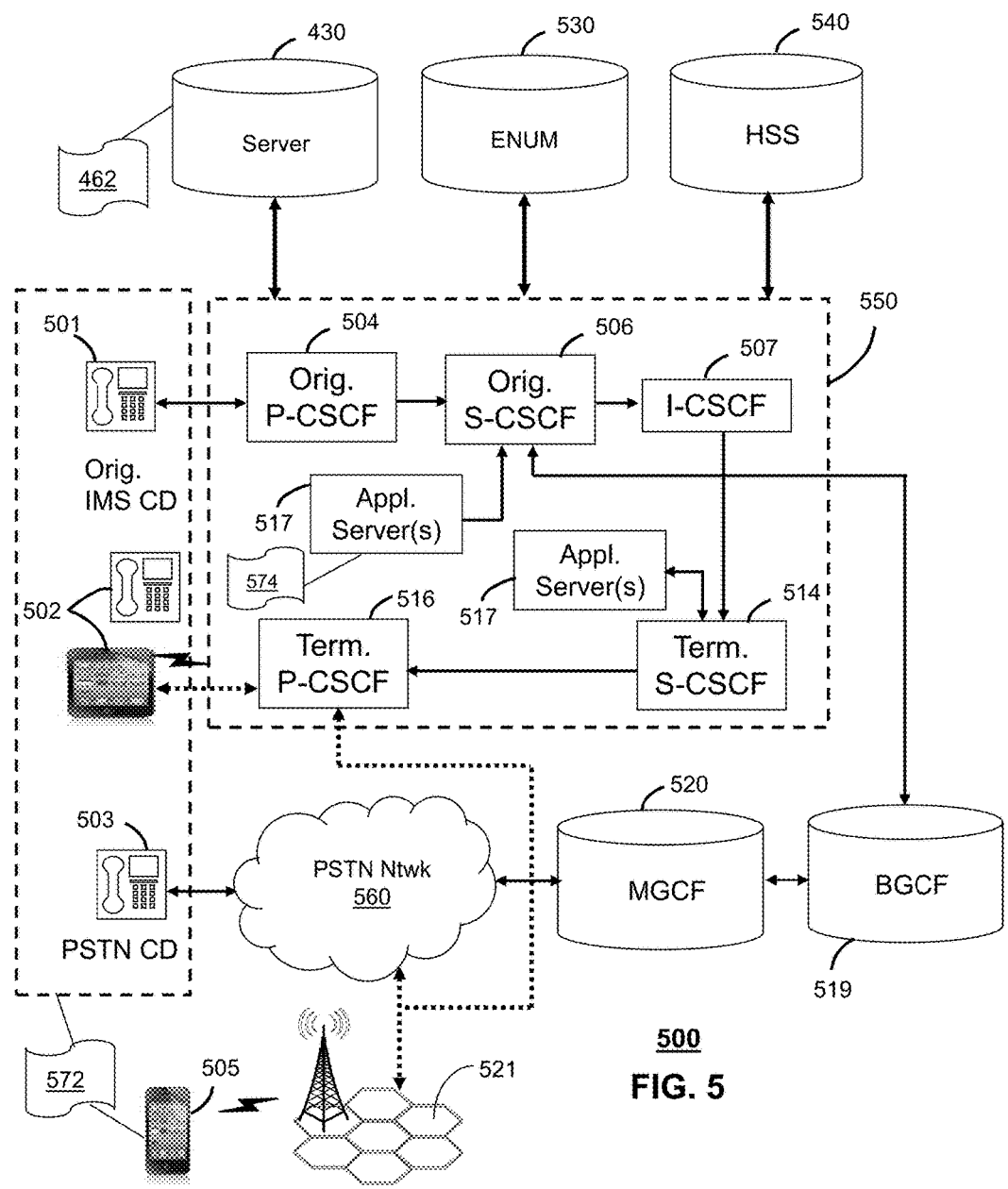

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100-200 of FIGS. 1-2 and communication system 400 as another representative embodiment of communication system 400, for providing sponsored messages that are triggered by associations of content features and user comments. Content may be streamed "over the top" (OTT) from an Internet website and/or application to a computer device, such as a wireless communication device, via a communication network 400. The communication network 400 can connect the streaming application to the computer device, while the communication network 400 serves as a conduit of the data to the subscriber of the device. Content and/or features in the content can be identified, while user-generated content from a device can also be monitored and keywords can be detected as this user-generated content is transmitted through the communication network 400. Upon the occurrence of a trigger event, where the content feature and the keyword occur in temporal proximity, a sponsored message can be sent to the device.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (aSs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to communication system 500 for purposes similar to those described above. Server 430 can perform function 462 and thereby provide content distribution services to the CDs 501, 502, 503 and 505 of FIG. 5 similar to the functions described for message server 130 of FIG. 1 in accordance with method 300 of FIG. 1. CDs 501, 502, 503 and 505, which can be adapted with software to perform function 572 to utilize the services of the server 430 similar to the functions described for computer device 116B and mobile communication device 116 of FIG. 1 in accordance with method 300 of FIG. 3. Server 430 can be an integral part of the application server 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
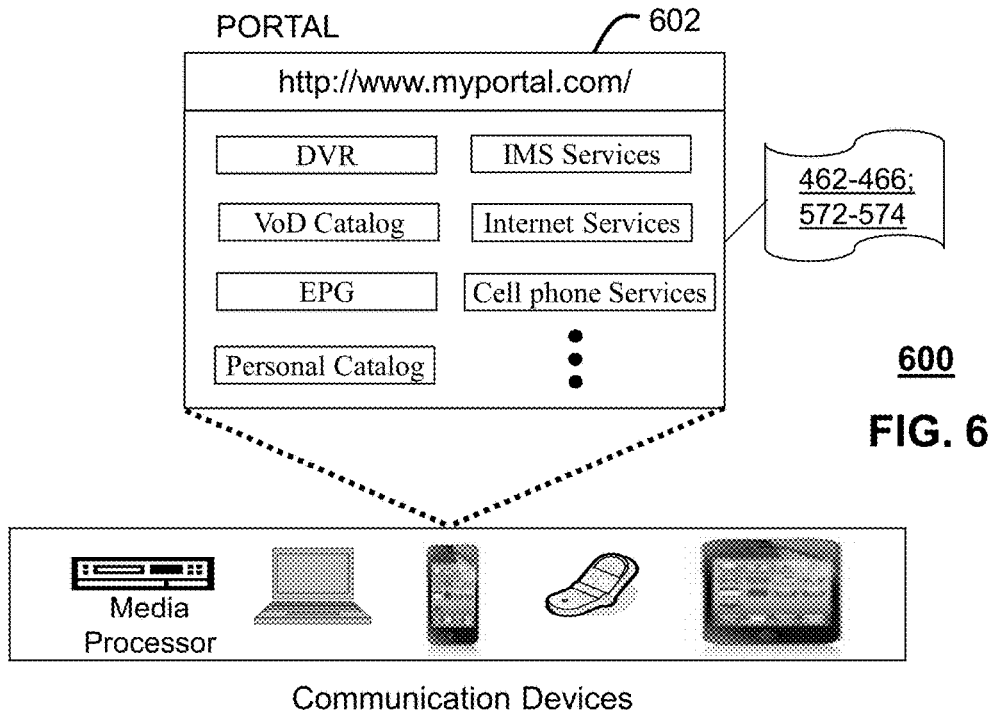
FIG. 6 depicts an illustrative embodiment of a web portal for interacting with the communication systems of FIGS. 1-2, and 4-5.

FIG. 6 depicts an illustrative embodiment of a web portal 602 of a communication system 600. Communication system 600 can be overlaid or operably coupled with systems 100-200 of FIGS. 1-2, communication system 400, and/or communication system 500 as another representative embodiment of systems 100-200 of FIGS. 1-2, communication system 400, and/or communication system 500. The web portal 602 can be used for managing services of systems 100-200 of FIGS. 1-2 and communication systems 400-500. A web page of the web portal 602 can be accessed by a Uniform Resource Locator (URL) with an Internet browser using an Internet-capable communication device such as those described in FIGS. 1-2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100-200 of FIGS. 1-2, and communication systems 400-500. For instance, users of the services provided by message server 130 or server 430 can log into their on-line accounts and provision the message server 130 or server 430 with user profiles and/or contact information to enable it to communication with devices described in FIGS. 1-5, and so on. Service providers can log onto an administrator account to provision, monitor and/or maintain the systems 100-200 of FIGS. 1-2 or server 430.

Figure 7:
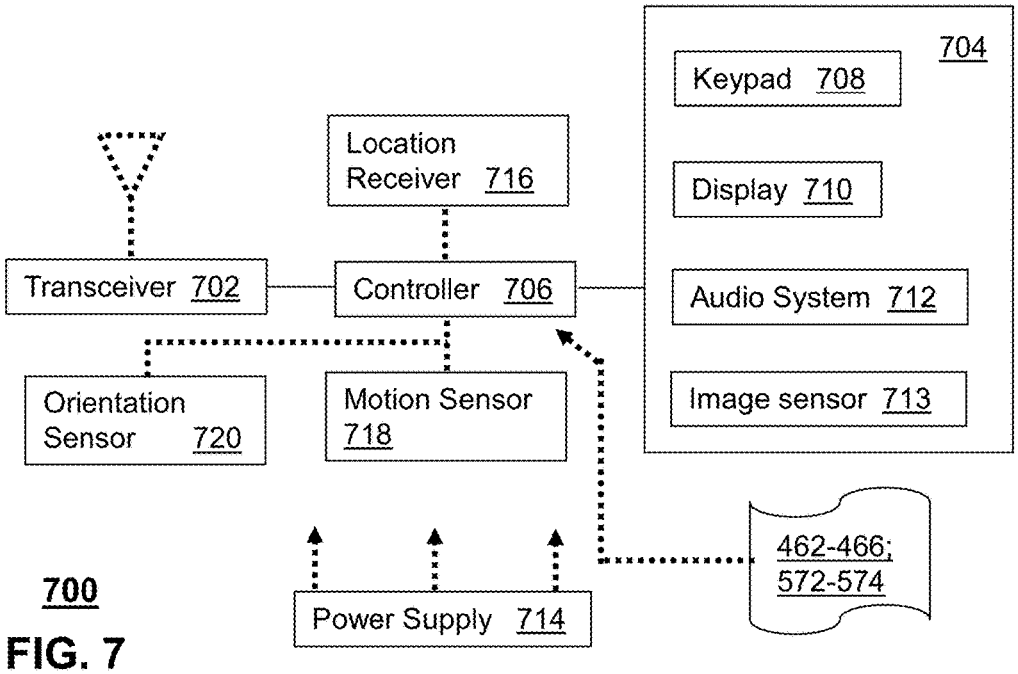
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1, 2, and 4-5, and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems of FIGS. 1 and/or 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
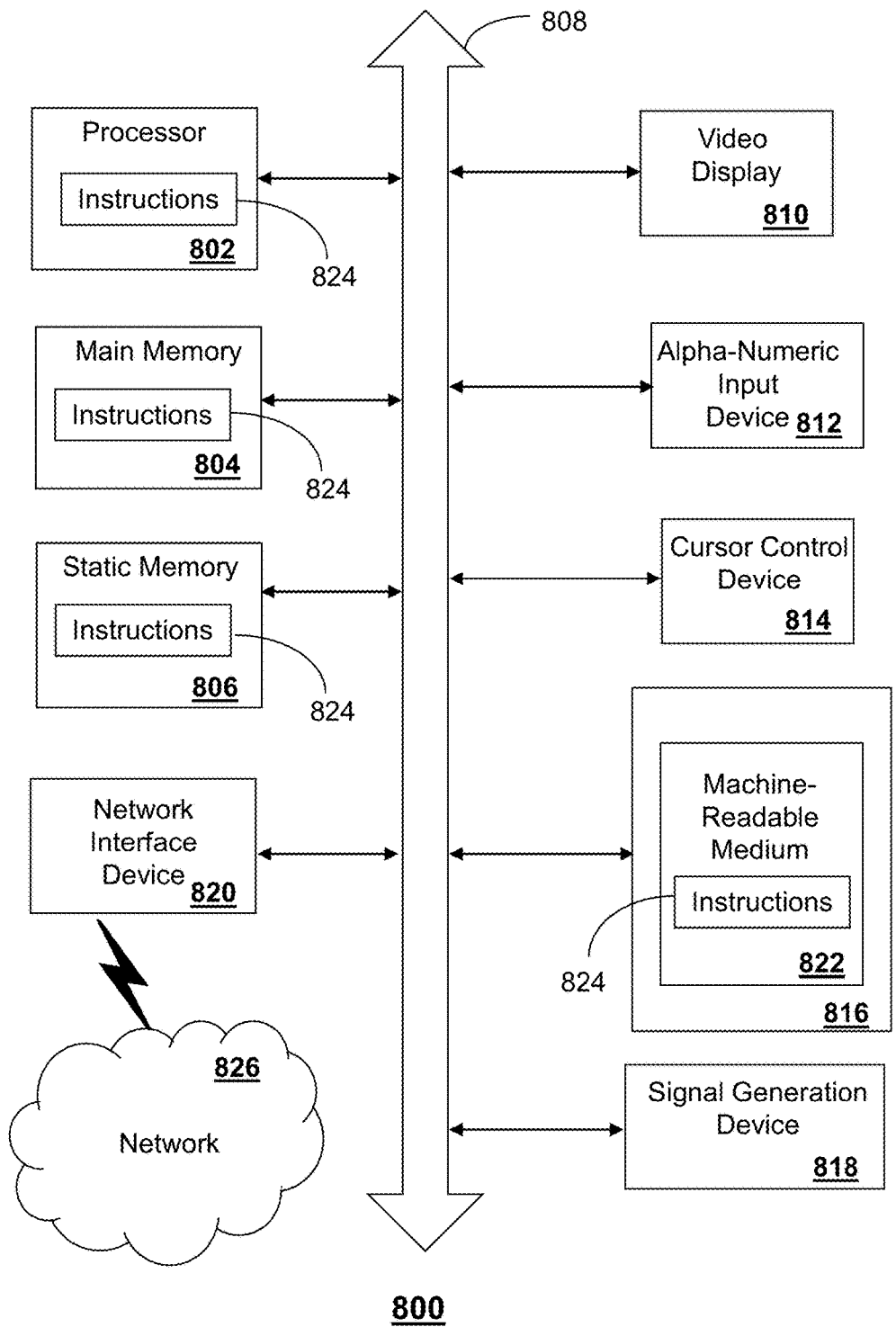
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the message server 130, the media processor 106, the mobile communication device 116, the computer device 116B, the preloading policy database 164, and other devices of FIGS. 1, 2, and 4-6. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions that, when executed by a processing system including a processor, facilitate performance of operations, comprising:

identifying a feature of content that is streamed to a communication device through a communication network;

accessing a user-generated comment transmitted from the communication device through the communication network;

determining whether the user-generated comment includes a keyword;

determining whether the keyword in the user-generated comment was temporally associated with the feature of the content streamed to the communication device to identify an occurrence of a trigger event; and transmitting a message associated with the trigger event to the communication device responsive to identifying the occurrence of the trigger event.

2. The non-transitory machine-readable storage medium of claim 1, wherein the operations further comprise:

monitoring the communication network to detect the content that is streamed the communication device through the communication network, and analyzing content information associated with the content responsive to detecting the content, wherein the feature of the content is further identified according to the analyzing of the content information.

3. The non-transitory machine-readable storage medium of claim 1, wherein the operations further comprise identifying the content that is streamed to the communication device through the communication network according to header information included in data packets associated with the content.

4. The non-transitory machine-readable storage medium of claim 1, wherein the operations further comprise defining the trigger event by associating the feature of the content streamed to the communication device with the keyword.

5. The non-transitory machine-readable storage medium of claim 1, wherein the operations further comprise querying a database for the message associated with the trigger event responsive to identification of the occurrence of the trigger event.

6. The non-transitory machine-readable storage medium of claim 1, wherein the user-generated comment that is transmitted from the communication device through the communication network is associated with a call session between the communication device and a second communication device.

7. The non-transitory machine-readable storage medium of claim 1, wherein the occurrence of the trigger event is further identified by analyzing a first timestamp associated with the user-generated comment and a second timestamp associated with the streaming of the content to communication device through the communication network.

8. The non-transitory machine-readable storage medium of claim 1, wherein the content that is streamed to the communication device through the communication network is selected by the communication device via a website.

9. The non-transitory machine-readable storage medium of claim 1, wherein the operations further comprise:

monitoring the communication network to capture user-generated information; and identifying the user-generated comment from the user-generated information that is captured.

10. The non-transitory machine-readable storage medium of claim 9, wherein the operations further comprise determining whether permission to monitor exists, wherein the monitoring of the communication network to capture user-generated information is enabled only if the permission to monitor is determined to exist.

11. The non-transitory machine-readable storage medium of claim 1, wherein the user-generated comment that is transmitted from the communication device through the communication network is a voice signal.

12. The non-transitory machine-readable storage medium of claim 1, wherein the user-generated comment that is transmitted from the communication device through the communication network is associated with a textual message.

13. A communication device, comprising:

a processing system including a processor; and a memory that stores executable instructions that, when executed by the processing system, facilitate performance of operations, comprising:

presenting content associated with a content stream received from a communication network;

receiving a user-generated comment associated with the presenting of the content; and transmitting the user-generated comment to a network element of the communication network, wherein the network element identifies an occurrence of a trigger event by determining whether the user-generated comment includes a keyword and whether the user-generated comment was temporally associated with a feature of the content; and receiving, from the network element, a message associated with the trigger event.

14. The communication device of claim 13, wherein the operations further comprise facilitating a call session with a second communication device via the communication network, wherein the user-generated comment is further associated with the call session.

15. The communication device of claim 13, wherein the operations further comprise selecting a web site via the communication network, wherein the content stream is facilitated by the website.

16. The communication device of claim 13, wherein the message is received via an SMS service.

17. The communication device of claim 13, wherein the message is received via an electronic mail service.

18. A method, comprising:

receiving, by a processing system including a processor, a user-generated comment associated with presentation of content at a presentation device; and transmitting, by the processing system, the user-generated comment to a network element of a communication network, wherein the network element identifies an occurrence of a trigger event by determining whether the user-generated comment includes a keyword and whether the user-generated comment was temporally associated with a feature of the content; and receiving, by the processing system, a message from the network element, associated with the trigger event.

19. The method of claim 18, wherein the feature of the content is identified by the network element according to header information included in data packets associated with the content.

20. The method of claim 18, wherein the occurrence of the trigger event is further identified by the network element by analyzing a first timestamp associated with the user-generated comment and a second timestamp associated with the content.

* * * * *